US008886122B2

(12) United States Patent
Kim et al.

(10) Patent No.: US 8,886,122 B2
(45) Date of Patent: Nov. 11, 2014

(54) METHOD OF OPERATING DIRECTORY PROXY AGENT IN LOW POWER WIRELESS PERSONAL AREA NETWORK, METHOD OF SEARCHING FOR SPECIFIC SERVICE INFORMATION THEREIN, AND DIRECTORY PROXY AGENT PERFORMING THE SAME THEREIN

(75) Inventors: Ki-Hyung Kim, Suwon-si (KR); Ahmad Chaudhry Shafique, Suwon-si (KR)

(73) Assignee: Ajou University Industry-Academic Cooperation Foundation, Suwon-si, Gyeonggi-do (KR)

( * ) Notice: Subject to any disclaimer, the term of this patent is extended or adjusted under 35 U.S.C. 154(b) by 557 days.

(21) Appl. No.: 12/525,653

(22) PCT Filed: Feb. 3, 2007

(86) PCT No.: PCT/KR2007/000589
§ 371 (c)(1),
(2), (4) Date: Aug. 3, 2009

(87) PCT Pub. No.: WO2008/096907
PCT Pub. Date: Aug. 14, 2008

(65) Prior Publication Data
US 2010/0105327 A1    Apr. 29, 2010

(51) Int. Cl.
*H04B 7/00* (2006.01)
*H04L 29/08* (2006.01)
*H04L 29/12* (2006.01)

(52) U.S. Cl.
CPC .......... *H04L 67/16* (2013.01); *H04L 29/12113* (2013.01); *H04L 29/12132* (2013.01); *H04L 61/1541* (2013.01); *H04L 61/1552* (2013.01)
USPC ....... 455/41.2; 455/41.3; 455/557; 455/456.3

(58) Field of Classification Search
CPC ..................... H04L 29/12113; H04L 61/1541; H04L 67/16; H04L 29/12132; H04L 61/1552; H04L 67/28; H04L 67/2838; H04L 67/303
See application file for complete search history.

(56) References Cited

U.S. PATENT DOCUMENTS

| 6,993,558 B2 | 1/2006 | Yokokura |
| 7,058,705 B1 | 6/2006 | Fukasawa et al. |
| 7,953,407 B1 * | 5/2011 | Makipaa ................ 455/426.1 |

(Continued)

FOREIGN PATENT DOCUMENTS

KR    1020050062999 A    6/2005

*Primary Examiner* — Yuwen Pan
*Assistant Examiner* — Fanghwa Wang
(74) *Attorney, Agent, or Firm* — Sherr & Jiang, PLLC

(57) ABSTRACT

A method of operating a directory proxy agent (DPA) in a low-power wireless personal area network (LoWPAN) includes advertising a service registration request message to neighboring nodes including at least one service agent and at least one user agent to receive a service registration message from the at least one service agent, storing information for the at least one service agent to a memory to refresh a service information list when the at least one service is not stored in the memory, and transmitting the service information list to at least one directory agent or another DPA to cause the at least one directory agent or the other DPA to be consistent with information for the at least one service agent. Thus, the method may use a DPA to effectively search for information for a service desired by a user agent.

3 Claims, 4 Drawing Sheets

(56) References Cited

U.S. PATENT DOCUMENTS

| | | | |
|---|---|---|---|
| 2002/0071416 A1* | 6/2002 | Carlson et al. | 370/338 |
| 2005/0114534 A1* | 5/2005 | Lee | 709/230 |
| 2005/0278646 A1* | 12/2005 | Liscano et al. | 715/762 |

* cited by examiner

METHOD OF OPERATING DIRECTORY PROXY AGENT IN LOW POWER WIRELESS PERSONAL AREA NETWORK, METHOD OF SEARCHING FOR SPECIFIC SERVICE INFORMATION THEREIN, AND DIRECTORY PROXY AGENT PERFORMING THE SAME THEREIN

CROSS REFERENCE TO PRIOR APPLICATION

The present application is a National Stage Application of PCT International Application No. PCT/KR2007/000589 (filed on Feb. 3, 2007), under 35 U.S.C. 371, which is hereby incorporated by reference in its entirety.

TECHNICAL FIELD

The present invention relates to a low-power wireless personal area network (LoWPAN). More particularly, the present invention relates to a method of operating a directory proxy agent (DPA) in the LoWPAN, a method of searching for a specific service therein, and a DPA therein so that a user agent may effectively search for information for a service desired by the user agent.

BACKGROUND ART

A low-power wireless personal area network (LoWPAN) refers to a wireless network used when information is transmitted over a relatively short distance. Unlike a wireless local area network (WLAN), the LoWPAN rarely uses an infrastructure, and thus communication through the LoWPAN provides a low-power and cost-effective solution.

FIG. 1 is a diagram for illustrating a procedure of searching for information for a service desired by a user agent in a local area network (LAN).

Referring to FIG. 1, processes (or devices) performed in a procedure of searching for the information includes a user agent 112, a directory agent 122 and a service agent 132.

The user agent 112 obtains a service information list including information for a service agent providing the service desired by the user agent 112 from the directory agent 122. For example, the service information list may include information for a service provided from the service agent 132 and an address of the service agent 132.

The user agent 112 requests the service from the service agent 132 through the address of the service agent 132 included in the service information list provided from the directory agent 122.

The service agent 132 performs the requested service by the user agent 112 and informs the user agent 112 of the results.

As described above, when the directory agent used in the conventional LAN is introduced into the LoWPAN, the user agent may not effectively search for the information for the service due to the relatively limited computing power of the LoWPAN.

Thus, a method of searching for the information for the service desired by the user agent in the LoWPAN is required.

DISCLOSURE OF THE INVENTION

Technical Problem

The present invention provides a method of operating a directory proxy agent (DPA) in a low-power wireless personal area network (LoWPAN) so that a user agent may effectively search for information for a service desired by the user agent.

The present invention provides a method of searching for a specific service in the LoWPAN so that a user agent may effectively search for information for a service desired by the user agent.

The present invention provides a DPA in the LoWPAN so that a user agent may effectively search for information for a service desired by the user agent.

Technical Solution

Accordingly, the present invention is provided to substantially obviate one or more problems due to limitations and disadvantages of the related art.

In some embodiments of the present invention, a method of operating a directory proxy agent (DPA) in a low-power wireless personal area network (LoWPAN) includes advertising a service registration request message to neighboring nodes including at least one service agent and at least one user agent to receive a service registration message from the at least one service agent, storing information for the at least one service agent to a memory to refresh a service information list when the at least one service agent is not stored in the memory, and transmitting the service information list to at least one directory agent or another DPA to cause the at least one directory agent or the other DPA to be consistent with information for the at least one service agent.

Advertising the service registration request message may include periodically broadcasting the service registration request message to advertise the service registration request message.

Transmitting the service information list may include receiving the information for the at least one service agent from the at least one directory agent or the other DPA to cause the memory to be consistent with the information for the at least one service agent.

The method may further include periodically receiving the information for the at least one service agent from the at least one directory agent or the other DPA to cause the memory to be consistent with the information for the at least one service agent.

In some embodiments of the present invention, a method of searching for information for a specific service in a LoWPAN includes searching for a DPA, transmitting a service request message to the searched DPA, the service request message including the information for the specific service desired by a user agent, and generating a service information list for a service agent providing the specific service to transmit a service response message including the service information list to the user agent when the DPA includes information for the service agent providing the specific service.

The method may further include receiving the information for the service agent from a directory agent or another DPA to generate the service information list including the information for the service agent and to transmit the service response message including the service information list when the DPA does not include the information for the service agent providing the specific service.

For example, the service request message may further include a location of the user agent, and the service information list may further include information for the nearest service agent with respect to the location of the user agent and a service agent of which transmission speed is the fastest so that when the number of the service agents is greater than or equal to 2, the user agent can select one of the service agents.

In some embodiments of the present invention, a DPA in a LoWPAN includes a memory, a service agent unit configured to advertise a service registration request message to neighboring nodes including at least one service agent and at least one user agent to receive a service registration message from the at least one service agent, and configured to store information for the at least one service agent to the memory to refresh a service information list when the information for the at least one service agent is not stored to the memory, a directory agent unit configured to transmit the service information list to at least one directory agent or another DPA to cause the at least one directory agent or the other DPA to be consistent with the information for the at least one service agent, and a user agent unit configured to receive a service request message including information for a service desired by a user agent and configured to generate the service information list for the at least one service agent providing the service desired by the user agent to transmit a service response message including the service information list to the user agent when the DPA includes the information for the service desired by the user agent.

The service agent unit may periodically broadcast the service registration request message to advertise the service registration request message.

The directory agent unit may receive the information for the at least one service agent from the directory agent or the other DPA to cause the memory to be consistent with the information for the at least one service agent.

The user agent unit may receive the information for the at least one service agent from the directory agent or the other DPA to generate the service information list including the information for the service and to transmit the service response message including the service information list when the DPA does not include the information for the service desired by the user agent.

Therefore, example embodiments of the present invention may use a DPA to effectively search for information for a service desired by a user agent.

BRIEF DESCRIPTION OF THE DRAWINGS

The above and other advantages of the present invention will become more apparent by describing in detail example embodiments thereof with reference to the accompanying drawings, in which.

BEST MODE FOR CARRYING OUT THE INVENTION

Figure 1:
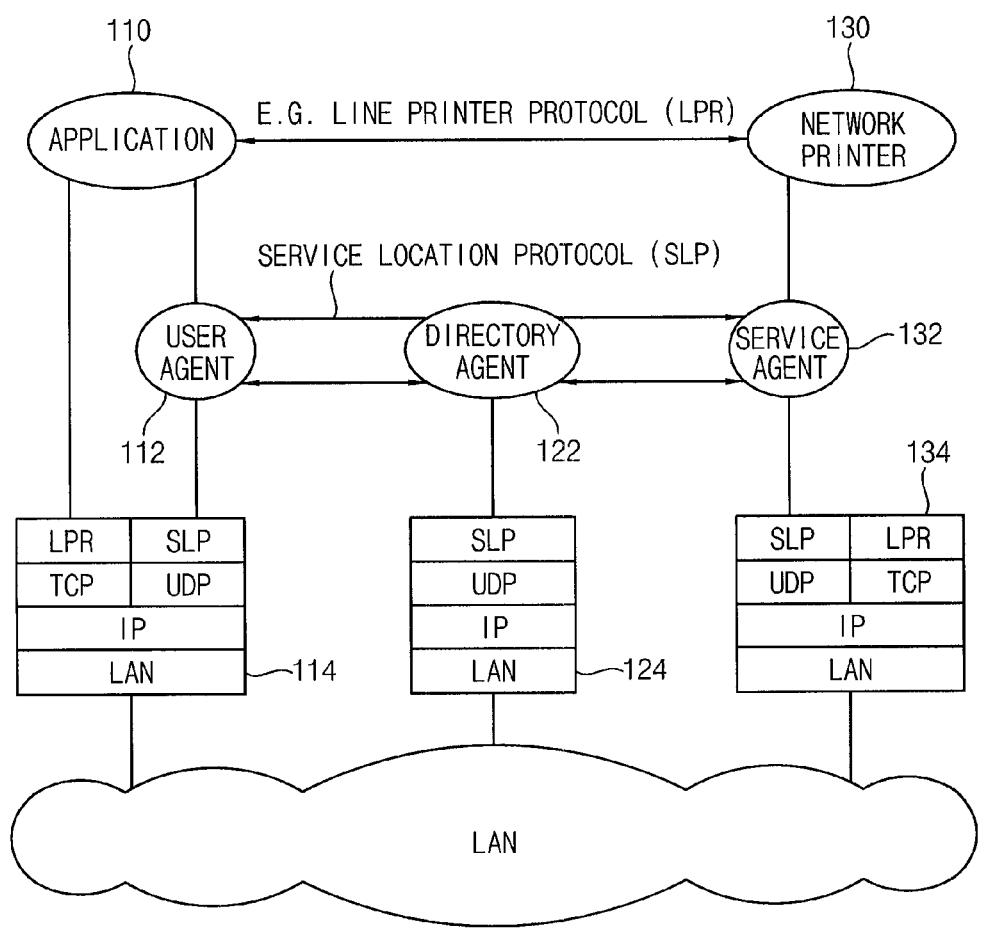
FIG. 1 is a diagram for illustrating a procedure of searching for information for a service desired by a user agent in a local area network (LAN).

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
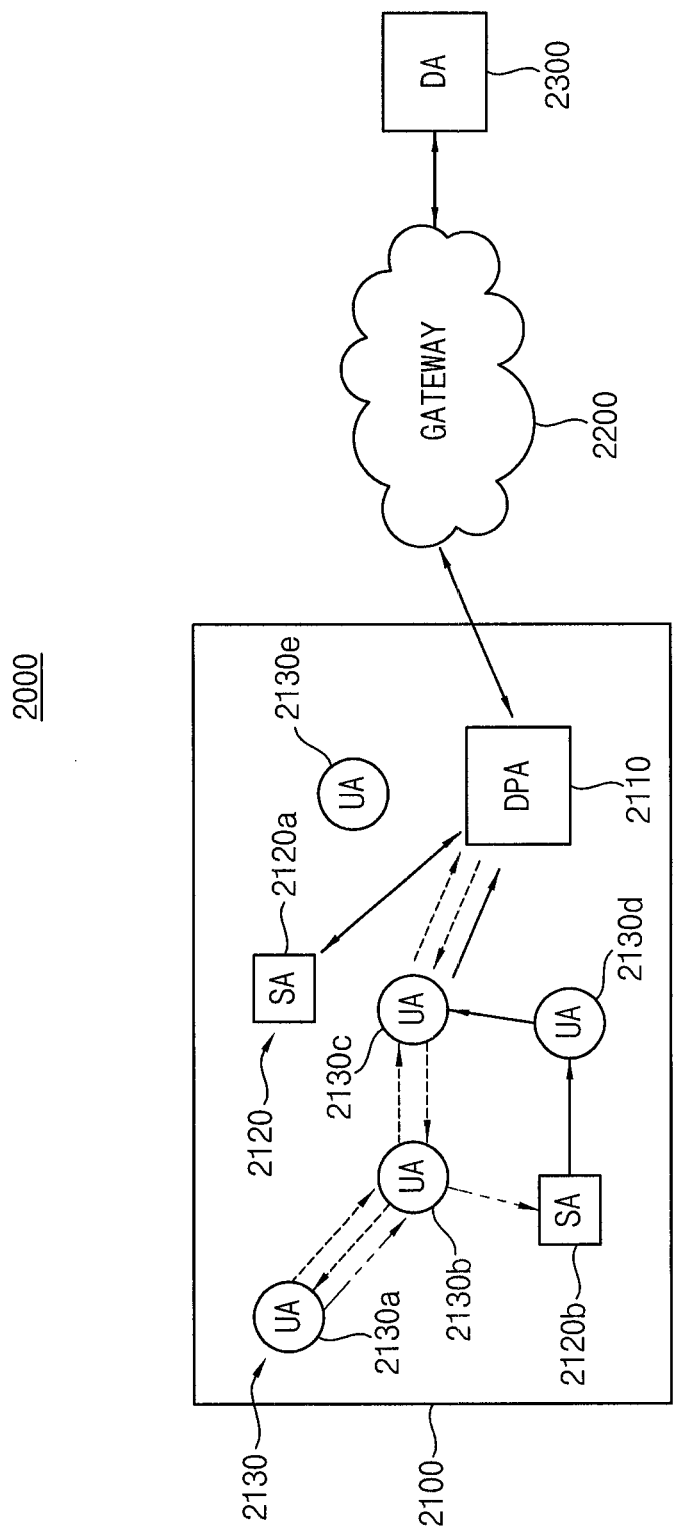
FIG. 2 is a diagram for illustrating a procedure of searching for information for a service desired by a user agent in a low-power wireless personal area network (LoWPAN).

FIG. 2 is a diagram for illustrating a procedure of searching for information for a service desired by a user agent in a low-power wireless personal area network (LoWPAN).

Referring to FIG. 2, an entire network 2000 includes a LoWPAN 2100, a gateway 2200 and a directory agent 2300.

The LoWPAN 2100 includes a directory proxy agent (DPA) 2110, at least one service agent 2120 and at least one user agent 2130.

The user agent 2130 refers to a process (or device) requesting a service, a service agent 2120 refers to a process (or device) providing the service to the user agent 2130, and the directory agent 2300 refers to a process (or device) providing information for the service agent 2120 to the user agent 2130 when the user agent 2130 searches for the service.

The DPA 2100 refers to a process (or device) temporarily storing the information for the service agent 2120 to reduce an amount of computations needed when the user agent 2130 requests the service from the service agent 2120 in the LoWPAN 2100.

The gateway 2200 performs a conversion between a protocol used in the LoWPAN 2100 (e.g., Simple Service Location Protocol (SSLP)) and a protocol used in the directory agent (e.g., Service Location Protocol (SLP)), if necessary.

The directory agent 2300 includes a database having a service type and a service agent address providing the service.

Hereinafter, a method of operating the DPA 2110 in the LoWPAN 2100 will be described.

The DPA 2110 advertises a service registration request message to neighboring nodes including at least one service agent 2130a and at least one user agent 2120c and 2120d to receive a service registration message from the at least one service agent 2120a. For example, the DPA 2110 may periodically broadcast the service registration request message to advertise the service registration request message.

The DPA 2110 stores information for the at least one service agent 2120a to a memory to refresh a service information list when the at least one service 2120a is not stored in the memory.

The DPA 2110 transmits the service information list to at least one directory agent 2300 or another DPA (not shown) to cause the at least one directory agent 2300 or the other DPA (not shown) to be consistent with information for the at least one service agent 2120.

For example, the DPA 2110 may receive the information for the at least one service agent 2120 from the at least one directory agent 2300 and another DPA (not shown) to cause the memory to be consistent with the information for the at least one service agent 2120.

Also, the DPA 2110 periodically receives the information for the at least one service agent 2120 from the at least one directory agent 2300 or the other DPA (not shown) to cause the memory to be consistent with the information for the at least one service agent 2120.

Hereinafter, a method in which the user agent 2130a searches for information for a specific service in the LoWPAN 2100 will be described.

The user agent 2130a searches for a DPA 2110. For example, when the user agent 2130a may not directly access the DPA 2110, the user agent 2130a may access the DPA 2110 via user agents 2130b and 2130c.

The user agent 2130a transmits a service request message to the searched DPA 2110, and the service request message includes the information for the specific service desired by the user agent 2130a.

The DPA 2110 generates a service information list for the service agent 2120b providing the specific service to transmit a service response message including the service information list to the user agent 2130a when the DPA 2110 includes information for the service agent 2120b providing the specific service.

Also, the DPA 2110 receives the information for the service agent 2020b from the directory agent 2300 or another DPA (not shown) to generate the service information list including the information for the service agent 2120b and to transmit the service response message including the service information list when the DPA 2110 does not include the information for the service agent 2120b providing the specific service.

The service request message may further include a location of the user agent 2130, and the service information list may further include information for the nearest service agent with respect to the location of the user agent 2130 and a service agent of which transmission speed is the fastest (e.g., 2120b) so that when the number of the service agents 2120 is greater than or equal to 2, the user agent can select one of the service agents.

Figure 3:
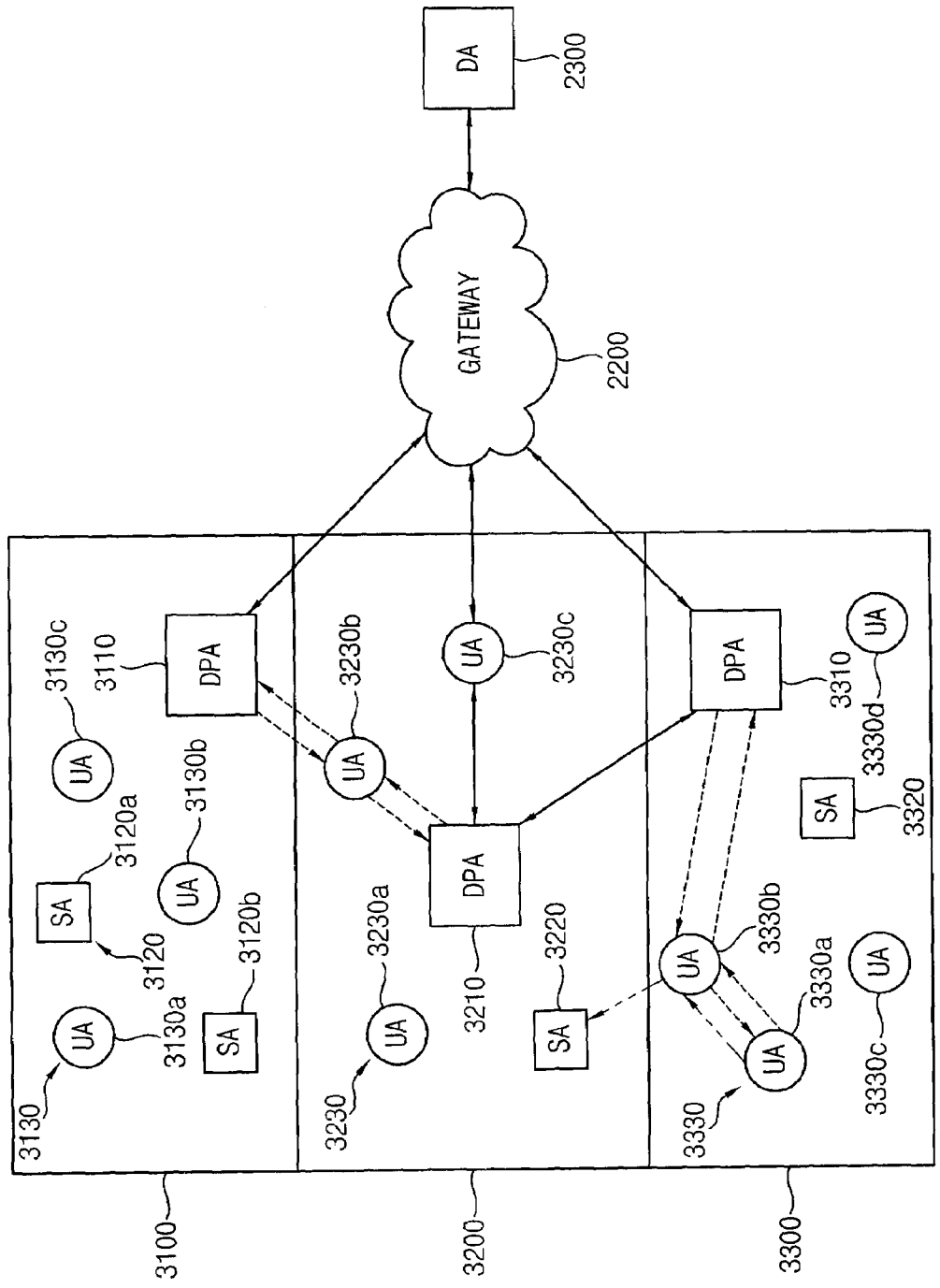
FIG. 3 is a diagram for illustrating a communication relationship between directory proxy agents (DPAs) in the LoWPAN and a procedure of searching for information for a service desired by a user agent in another LoWPAN.

FIG. 3 is a diagram for illustrating a communication relationship between DPAs in the LoWPAN and a procedure of searching for information for a service desired by a user agent in another LoWPAN.

Hereinafter, a communication relationship between DPAs in the LoWPAN will be described.

A DPA 3110 may receive the service information list from another DPA 3210 and may transmit the service information list to the other DPA 3210, if necessary.

For example, the DPA 3110 may receive the service information list from the DPA 3210 via a user agent 3130b, and may transmit the service information list to the DPA 3210 via the user agent 3130b.

Hereinafter, a procedure of searching for information for a service desired by a user agent in another LoWPAN will be described.

A user agent 3330a receives the service information list including information for the service agent 3120 from a DPA 3210 so as to search for the service agent 3120 providing a service desired by the user agent 3330a.

When the DPA 3210 does not include the information for the service agent 3120b providing the service desired by the user agent 3230a, the DPA 3210 receives the information for the service agent 3120b in the LoWPAN from the directory agent 2300 or another DPA 3110 to generate the service information list including the information for the service agent 3120b and to transmit the service response message including the service information list when the DPA 3210 does not include the information for the service agent 3120b providing the specific service.

Figure 4:
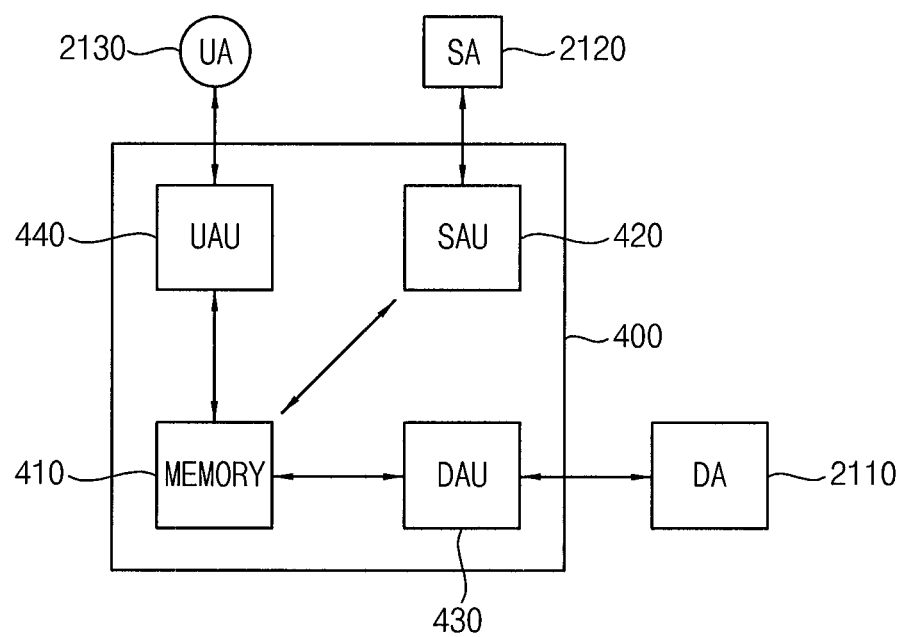
FIG. 4 is a block diagram illustrating a configuration of a DPA in the LoWPAN.

FIG. 4 is a block diagram illustrating a configuration of a DPA in the LoWPAN.

Referring to FIG. 4, a DPA 400 includes a memory 410, a service agent unit 420, a directory agent unit 430 and a user agent unit 440.

The service agent unit 320 advertises a service registration request message to neighboring nodes including at least one service agent 2120 and at least one user agent 2130 to receive a service registration message from the at least one service agent 2120, and stores information for the at least one service agent 2120 to the memory 410 to refresh a service information list when the information for the at least one service agent 2120 is not stored to the memory 410.

For example, the service agent unit 320 may periodically broadcast the service registration request message to advertise the service registration request message.

The DPA 430 transmits the service information list to at least one directory agent 2110 or another DPA (not shown) to cause the at least one directory agent 2110 or the other DPA (not shown) to be consistent with the information for the at least one service agent 2120.

For example, the directory agent unit 430 receives the information for the at least one service agent 2120 from the directory agent 2110 or the other DPA (not shown) to cause the memory 410 to be consistent with the information for the at least one service agent 2120.

The user agent unit 2130 receives a service request message including information for a service desired by the user agent 2130 and generates the service information list for the at least one service agent 2120 providing the service desired by the user agent 2130 to transmit a service response message including the service information list to the user agent 2130 when the DPA 430 includes the information for the service desired by the user agent 2130.

Also, the user agent unit 2130 receives the information for the at least one service agent 2120 from the directory agent 2110 or the other DPA (not shown) to generate the service information list including the information for the service and to transmit the service response message including the service information list when the DPA 430 does not include the information for the service desired by the user agent 2130.

INDUSTRIAL APPLICABILITY

Example embodiments of the present invention may use a directory proxy agent (DPA) to effectively search for information for a service desired by a user agent.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The invention claimed is:

1. A method of providing a specific service in a low-power wireless personal area network (LoWPAN) system comprising a plurality of directory proxy agents (DPAs), at least one directory agent (DA), at least one service agent, and at least one user agent, the method comprising:
 periodically advertising, by each of the plurality of DPAs, a service registration request message to the at least one service agent to receive a service registration message from the at least one service agent, wherein the service registration request message is periodically broadcasted to advertise the service registration request message,
 wherein the at least one service agent transmits the service registration request message to at least one neighboring node each having a respective service agent when at least one user agent receives the service registration request message from each of the plurality of DPAs;
 temporarily storing at least one service agent information in a memory included in a respective DPA, wherein a service information list stored in the respective DPA is refreshed to update the at least one service agent information when the at least one service agent information is not previously stored in the memory;
 searching, by the at least one user agent, for a desired DPA transmitting a service request message to a searched DPA and receiving the specific service from the at least one service agent wherein the service request message comprises a location of a respective user agent in order to determine a nearest service agent and the service agent of which transmission speed is faster than the other service agent,
 wherein the user agent accesses to the DPA via at least one different user agent when the user agent does not directly access to the DPA;
 transmitting the service information list to the at least one directory agent (DA) and another DPA to update the at least one service agent information to be consistent with tile service information list stored in the respective DPA, wherein each of the plurality of DPAs receives or transmits the service information list from or to the at least one directory agent (DA) to provide the specific service,
 wherein the specific service is independently provided by the at least one service agent;
 wherein,
 when the respective DPA does not have the service agent information for a particular service agent providing the specific service desired by a respective user agent, the respective DPA receives the service agent information for the particular service agent from another one of the plurality of DPAs to generate the service information list including the service agent information for the particular service agent and transmits a service response message including the service information list,
 when the another one of the plurality of DPAs does not have the service information for the particular service, the respective DPA does not transmit the service response message including the service information list;
 providing the specific service directly to the at least one user agent from the at least one service agent; and
 providing, by tile respective DPA, a service agent address to the at least one user agent when the at least one user agent searches for the specific service.

2. The method of claim 1, wherein the directory agent transmits the service information list to each of the plurality of DPAs to update the service agent information stored in the plurality of DPAs.

3. The method of claim 1, wherein the service information list comprises a nearest service agent information with respect to a location of the respective user agent.

* * * * *